United States Patent [19]

Hickey

[11] Patent Number: 5,168,857
[45] Date of Patent: Dec. 8, 1992

[54] INTEGRALLY FORMED FUEL RAIL/INJECTORS AND METHOD FOR PRODUCING

[75] Inventor: John C. Hickey, Ypsilanti, Mich.

[73] Assignee: Ford Motor Company, Dearborn, Mich.

[21] Appl. No.: 873,497

[22] Filed: Apr. 23, 1992

Related U.S. Application Data

[63] Continuation of Ser. No. 615,834, Nov. 19, 1990, abandoned.

[51] Int. Cl.⁵ .................. F02M 55/02; F02M 51/00
[52] U.S. Cl. .................. 123/468; 123/472; 123/456; 239/585.4; 239/600
[58] Field of Search .............. 123/456, 468, 469, 470, 123/472; 239/550, 600, 585; 264/275, 277, 328.1, 328.8

[56] References Cited

U.S. PATENT DOCUMENTS

| | | | |
|---|---|---|---|
| 2,721,100 | 10/1955 | Bodine, Jr. | |
| 4,393,994 | 7/1983 | Rieck | 239/585 |
| 4,405,912 | 9/1983 | Palma et al. | 335/260 |
| 4,509,693 | 4/1985 | Nakai | 239/585 |
| 4,552,311 | 11/1985 | Casey | 239/585 |
| 4,570,601 | 2/1986 | Ito et al. | 123/468 |
| 4,585,176 | 4/1986 | Kubach et al. | 239/585 |
| 4,660,770 | 4/1987 | Gieseking | 239/585 |
| 4,712,582 | 12/1987 | Marks | 137/625.29 |
| 4,742,964 | 5/1988 | Ito et al. | 123/470 |
| 4,753,416 | 6/1988 | Inagaki et al. | 251/129.15 |
| 4,776,313 | 10/1988 | Freismuth et al. | 123/468 |
| 4,875,658 | 10/1989 | Asai | 251/129.21 |
| 4,907,748 | 3/1990 | Gardner et al. | 239/584 |
| 4,955,347 | 9/1990 | Toyoda | 123/472 |
| 4,979,295 | 12/1990 | Stagni et al. | 123/470 |

FOREIGN PATENT DOCUMENTS

| | | | |
|---|---|---|---|
| 0347914 | 12/1989 | European Pat. Off. | 123/422 |
| 3825135 | 1/1990 | Fed. Rep. of Germany | 123/472 |
| 0310165 | 12/1989 | Japan | 123/472 |

Primary Examiner—E. Rollins Cross
Assistant Examiner—Thomas Moulis
Attorney, Agent, or Firm—Allan J. Lippa; Peter Abolins

[57] ABSTRACT

A plastic molded fuel rail includes a plurality of core fuel injector assemblies molded within the fuel rail. Each core fuel injector assembly includes a magnetic core, electrical coil bobbin having electrical contacts extending therefrom, and axial fuel passageway. The magnetic core, coil bobbin assembly, and electrical contacts are hermetically sealed from the fuel passageways. An armature and sleeve including a needle and seat valve are inserted into the core fuel injector assemblies to provide fuel injectors.

5 Claims, 5 Drawing Sheets

INTEGRALLY FORMED FUEL RAIL/INJECTORS AND METHOD FOR PRODUCING

This application is a continuation of application Ser. No. 07/615,834, filed Nov. 19, 1990, now abandoned.

BACKGROUND OF THE INVENTION

The field of the invention relates to electromagnetic fuel injectors, fuel rails and processes for fabricating same.

For motor vehicle applications in particular, it is known to mechanically couple a plurality of electromagnetic fuel injectors between a fuel rail and an intake manifold of an internal combustion engine. In response to an electronic drive signal, the actuated fuel injector passes fuel from the fuel rail into the intake manifold for a predetermined time. A typical fuel injector, which is illustrated herein in Prior Art FIG. 1, is shown connected to fuel rail 102 by fuel connector 6. Fuel injector 10, which is one of a plurality of fuel injectors connected to fuel rail 4, includes housing 12 constructed of an electromagnetic permeable material and having a lower housing 14 crimped to an upper housing 16. Lower housing 14 is fabricated by a conventional cold heading and machining process which forms fuel passageway 18 and cavity 20 for receiving coil bobbin assembly 22 therein. Electrical contacts 24 are positioned through plastic cap 26 and connected to coil bobbin assembly 22 through housing 12. Placement of "O" ring 28 and "O" ring 30 on respective lower housing 14 and upper housing 16 within cavity 20 is required to seal coil bobbin assembly 22 and electrical contacts 24 from fuel passageway 18.

Continuing with Prior Art FIG. 1, armature 34 is slidably, axially mounted within fuel passageway 18 and biased against spring 32. Armature 34 is connected to stem 36 which is axially positioned within sleeve 42 and includes conical end 38. Lower housing 14 is crimped to sleeve 42. Sleeve 42 has a conical seat 46 formed around valve opening 50 for mating with conical end 38 of stem 36 thereby forming a needle and seat valve. Fuel passageway 18 communicates with sleeve 42 and extends through upper housing 16 to fuel connector 6 which mates with fuel rail 4.

During operation of the above described prior art device, electrical actuation of coil bobbin assembly 22 induces a magnetic field through a magnetic core defined by lower housing 14 and upper housing 16. This induced magnetic field couples to armature 34 deflecting it against spring 32 thereby opening the needle and seat valve.

The inventor herein has recognized numerous disadvantages of the prior art device described above. Numerous processing and assembly steps are required to fabricate a fuel rail and couple each individual fuel injector to the fuel rail through a corresponding fuel connector. Further, for each fuel injector, several "O" rings and corresponding assembly steps are required to seal coil bobbin assembly 22 and electrical contacts 24 from fuel passageway 18. In addition, complicated processing steps are required such as cold heading and machining lower housing 12 to form fuel passageway 18 and cavity 20. Cumbersome crimping steps are also required to assemble lower housing 12 to upper housing 14 and sleeve 42. The magnetically permeable housing is also susceptible to corrosion in typical under hood environments.

SUMMARY OF THE DISCLOSURE:

An object of the invention described herein is to eliminate the need for a fuel rail which is totally separate from the fuel injectors and eliminate the fuel connectors of prior approaches. A further object is to provide a fuel injector requiring fewer fabricating and assembly steps than heretofore possible and eliminating the need to seal the electrical fuel injector portions, including the coil bobbin assembly and electrical contacts, from the fuel passageways.

The above described object is achieved, disadvantages of prior approaches overcome, and other objects and advantages obtained by providing a fuel rail assembly having electromagnetic portions of a fuel injector integrally formed within the fuel rail, and processes for fabricating such apparatus, as claimed herein. In one aspect of the invention, the fuel rail assembly comprises: a plurality of fuel injectors each including a magnetic core comprised of a magnetic permeable material having an opening and an electric coil assembly positioned within the magnetic core opening for coupling magnetic energy to the magnetic core; molding means comprised of injection molded plastic for hermetically sealing each of the coil assemblies within each of the magnetic cores and also forming a cavity through each of the coil assemblies, the molding means also forming a fuel rail with a fuel path communicating with each of the cavities for coupling to the fuel supply; a plurality of armatures for each of the fuel injectors, each of the armatures is comprised of a magnetic permeable material slidably inserted into the molding means cavity and magnetically responsive to the magnetic core; and a plurality of valve means for each of the fuel injectors, each of the valve means being mechanically responsive to the armature and coupled to the molding means cavity for controlling fuel flow from the fuel path through the valve means.

In another aspect of the invention, a method for integrally forming a fuel rail assembly having a plurality of core fuel injector assemblies each coupled to a source of fuel is provided. One such method comprises the steps of: positioning each of a plurality of electric coil assemblies within a corresponding magnetic core to form a plurality of the core fuel injector assemblies and positioning each of the core fuel injector assemblies within a separable mold wherein each of the electric coil assemblies includes a wire wound on a bobbin having a pair of electrical contacts extending therefrom; inserting each of a plurality of first removable pins into an opening concentrically formed in each of the core fuel injector assemblies; inserting a second removable pin into the mold which communicates with each of the core fuel injector assemblies; inserting each of a plurality of third removable pins to encapsulate each of the pair of electrical contacts; injecting plastic into the mold for hermetically sealing each of the coil assemblies within the corresponding magnetic core for each of the core fuel injector assemblies and also hermetically sealing each of the pair of electrical contacts; removing the first pins to define a fuel passageway in each of the core fuel injector assemblies and removing the second pin to define a fuel path communicating with the fuel passageways; removing the third pins to define an electrical connection for the pair of electrical contacts for each of the core fuel injector assemblies which is external to the fuel rail assembly and sealed from the fuel passageways; removing the separable mold to provide the fuel rail assembly with the plurality of core fuel injector assemblies hermetically sealed therein; inserting each of a plurality of armatures into each of the fuel passageways of the core fuel injector assemblies; and coupling each of a plurality of valve assemblies to each of the fuel passageways of the core fuel injector assemblies.

An advantage of the above aspect of the invention is that the core fuel injector assemblies, including the magnetic core and coil bobbin assembly, are integrally formed with the fuel rail thereby eliminating the disadvantage of separate fabrication and assembly steps inherent with prior approaches. Another advantage is that the electric coil assembly and associated electrical contacts are hermetically sealed and isolated from the fuel passageway by injection molding plastic during the fabrication process without the need for installing numerous "O" rings or bonding, and sealing the electrical contacts which are disadvantages of prior approaches. The coil assembly is completely surrounded within the molded plastic, and the molding provides a separate fuel path, which eliminates any interfaces which would otherwise require "O" rings or bonding. Still another advantage is that the fuel injector housing is integrally formed from the injection molded plastic thereby eliminating the prior approach processing disadvantages of cold heading, machining, and crimping housing portions together. Another advantage is that the need for a magnetically permeable housing to create the magnetic core and the inherent disadvantage of susceptibility to corrosion is also eliminated.

In another aspect of the invention, a method comprises the steps of: positioning each of a plurality of electric coil assemblies within a corresponding magnetic core to form a plurality of the core fuel injector assemblies and positioning each of the core fuel injector assemblies within a separable mold; inserting each of a plurality of first removable pins into an opening concentrically formed in each of the core fuel injector assemblies; injecting plastic into the mold for hermetically sealing each of the coil assemblies within the corresponding magnetic core for each of the core fuel injector assemblies; removing the first pins to define a fuel passageway in each of the core fuel injector assemblies; removing the separable mold to provide the fuel rail assembly with the plurality of core fuel injector assemblies hermetically sealed therein; inserting each of a plurality of armatures into each of the fuel passageways of the core fuel injector assemblies; and coupling each of a plurality of valve assemblies to each of the fuel passageways of the core fuel injector assemblies.

The above method may include the steps of inserting a second removable pin in alignment with the magnetic core and removing the second removable pin after the injection molding step to define an upper fuel path communicating with each of the fuel passageways. Accordingly, an integrally formed fuel rail with embedded injectors is fabricated wherein each of the injectors has a common top fuel feed.

In another aspect, the method further comprises the steps of inserting a longitudinal pin in alignment with placement of the valve assemblies and removing the longitudinal pin after the injection molding step to define a lower fuel path communicating with each of the valve assemblies. In accordance with this aspect of the invention, an integrally formed fuel rail is provided having embedded fuel injectors communicating with a lower fuel feed.

In another aspect of the invention, the method comprises the steps of inserting a second removable pin in alignment with the magnetic core, inserting a longitudinal pin in alignment with placement of the valve assemblies, and removing both the second removable pin and the longitudinal pin after the injection molding step to respectively define an upper fuel path and a lower fuel path communicating in parallel with each of the core fuel injector assemblies. In accordance with this aspect of the invention, an integrally formed fuel rail is provided having embedded fuel injectors receiving fuel from an upper fuel path and returning excess fuel to a lower path. This configuration may be referred to as a parallel configuration.

An advantage of the above aspects of the invention, is that an integrally formed fuel rail with embedded fuel injectors is fabricated wherein said simple placement of molding pins provides: a common upper fuel feed; or a common lower fuel feed; or a parallel combination of upper fuel feed with lower fuel feed return.

BRIEF DESCRIPTION OF THE DRAWINGS:

The objects and advantages described herein will be more fully understood, and others will become apparent, by reading an example of an embodiment in which the invention is used to advantage, referred to herein as the Preferred Embodiment, with reference to the drawings wherein.

DESCRIPTION OF THE PREFERRED EMBODIMENT

Figure 2:
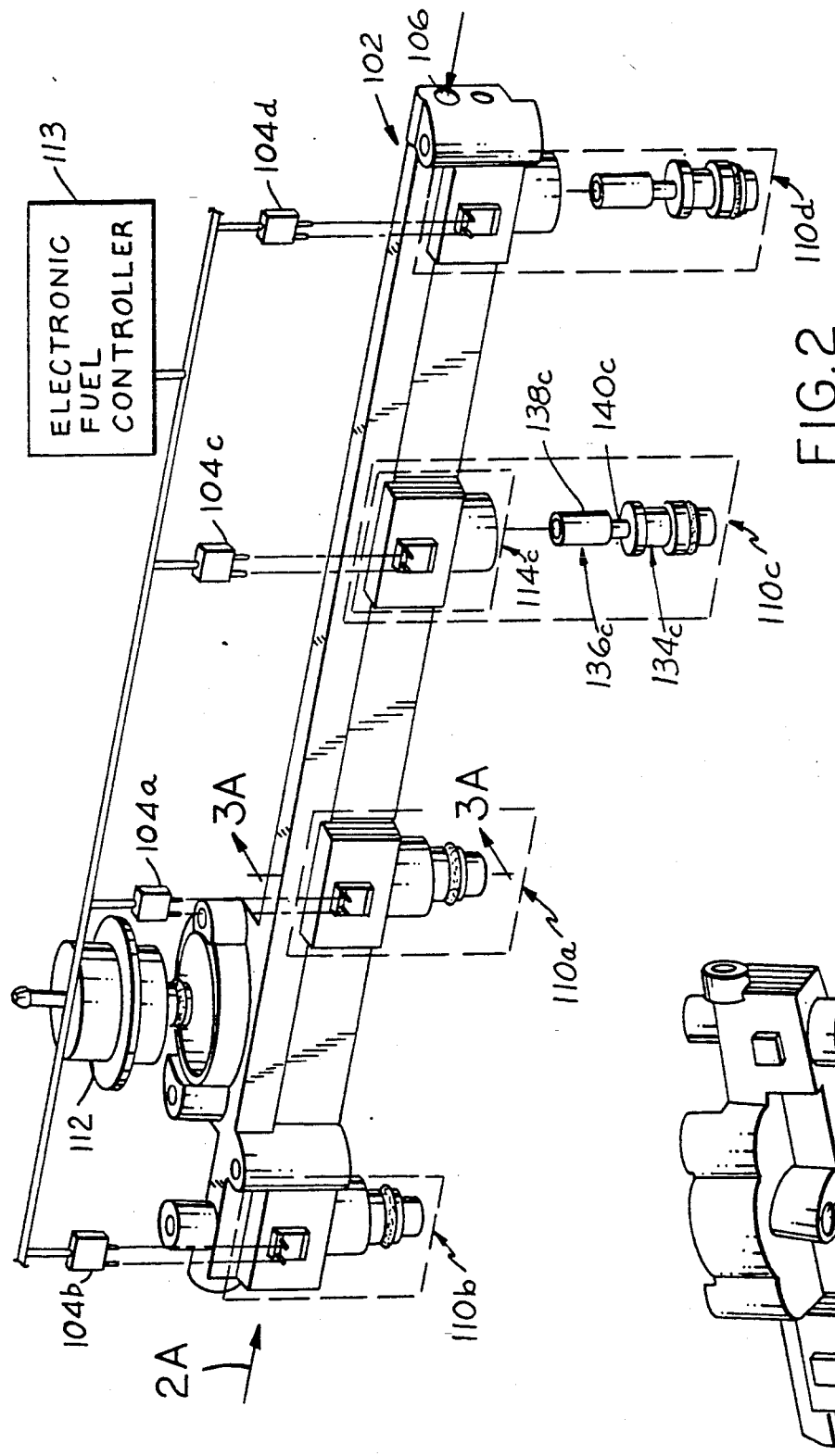
FIG. 2 is a perspective view of an integrally formed fuel rail assembly having portions of a plurality of fuel injectors formed therein and also showing additional portions of such fuel injectors which are to be inserted into the fuel rail assembly.
Figure 2A:
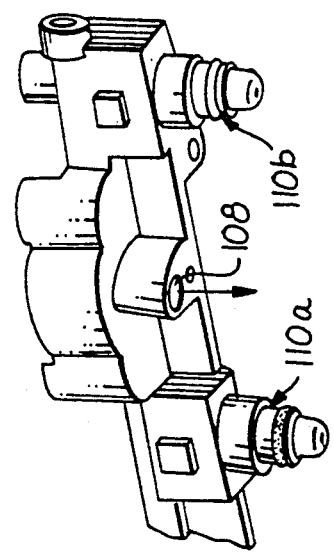
FIG. 2A is partially broken away and rotated view of the fuel rail assembly shown in FIG. 2.

Referring first to FIG. 2, integrally formed fuel rail assembly 102 is shown for illustrative purposes having a plurality of fuel injectors 110a–110d. As described in greater detail later herein, each of the fuel injectors 110a-110d includes one of the corresponding core fuel injector assemblies 114a-114d, which are molded within fuel rail 102, and one of the corresponding armature assemblies 136a-136d inserted within one of the corresponding sleeves 134a-134c. Fuel rail 102 also includes fuel inlet 106, coupled to a source of fuel such as a fuel pump (not shown), and fuel outlet 108 for returning fuel to a fuel supply or fuel tank (not shown). Conventional pressure regulator 112 is shown coupled to fuel rail 102 for maintaining a desired fuel pressure therein. In this particular example, fuel injectors 110a-110d are electronically actuated, via respective pair of electrical contacts 120a-120d, by conventional fuel controller 113, via respective electrical connectors 106a-106d, for metering desired quantities of fuel, at desired times, from fuel rail 102 into an intake manifold (not shown) of an internal combustion engine (not shown).

Figure 1:
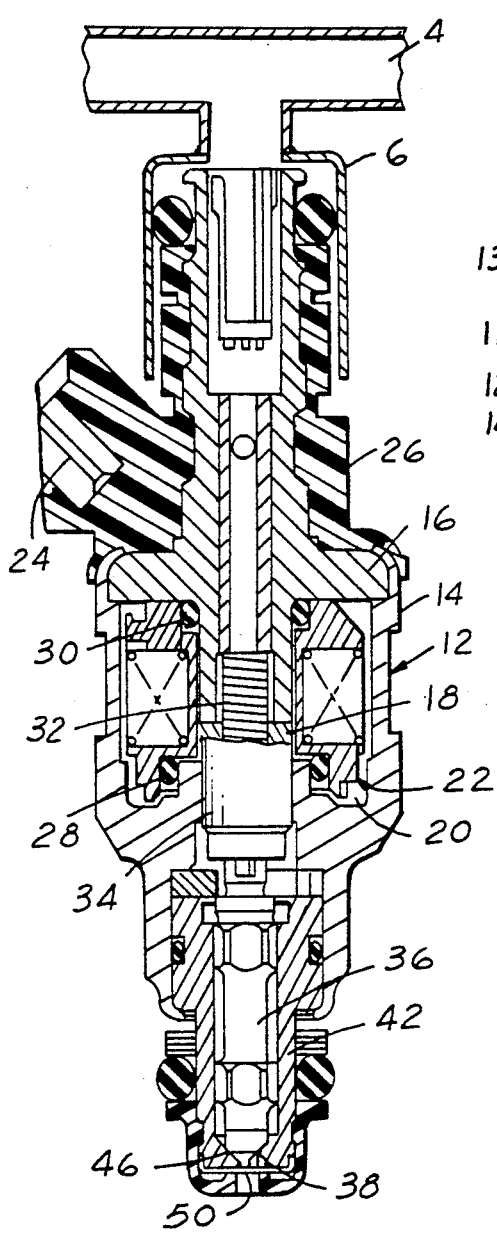
FIG. 1 is a cross-sectional view of a Prior art fuel injector described further in the Background of the Invention section.
Figure 3A:
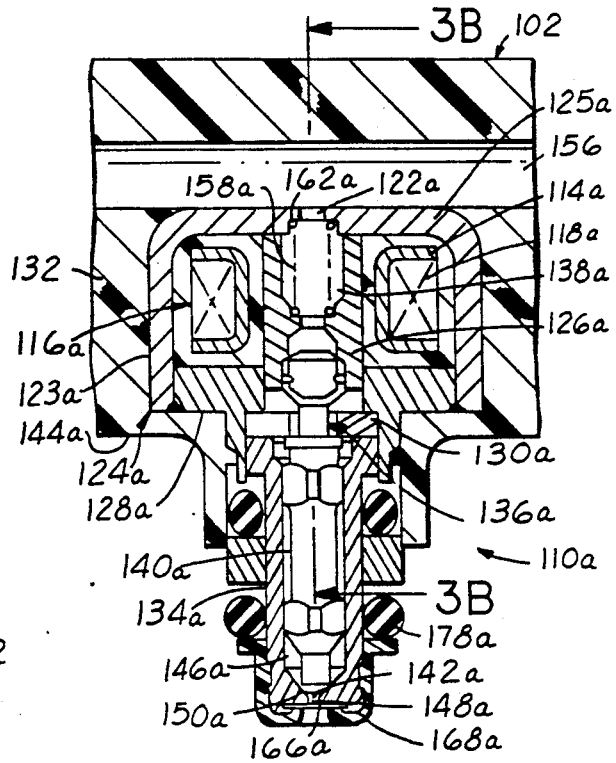
FIG. 3A is a cross-sectional view of a single fuel injector partially embedded within the fuel rail assembly taken along lines 3A—3A in FIG. 2.
Figure 3B:
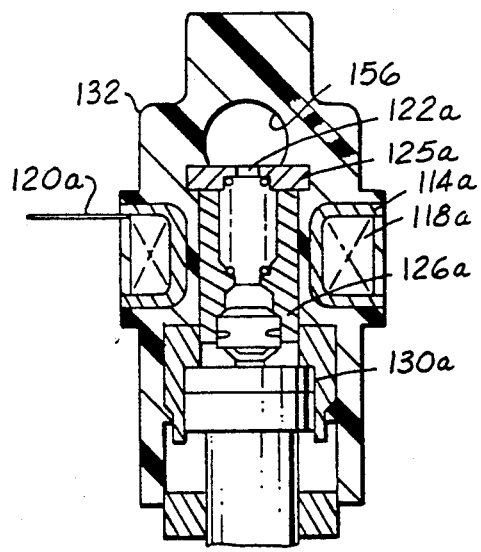
FIG. 3B is a partially broken away and rotated view of FIG. 3A.

A cross-sectional view of a portion of fuel rail 102 and fuel injector 110a, taken along line 3A—3A of FIG. 2, is shown in FIG. 3A and FIG. 3B. In this particular example, core fuel injector assembly 114a is shown including coil bobbin assembly 116a inserted within a stator or magnetic core 124a. Coil bobbin assembly 116a includes wire 118a wound about bobbin 119a and having opposing ends connected to pair of electrical contacts 120a for connection to electronic fuel controller 113.

As described in greater detail later herein with particular reference to FIGS. 4-6, injection molded plastic 132 seals coil bobbin assembly 116a within magnetic core 124a, and also forms both housing 144a and axial fuel passageway 126a. Injection molded plastic 132 also forms fuel rail 102 and fuel path 156 within fuel rail 102 which communicates with fuel passageways 126a-126d. In addition, molded plastic 132 also seals coil bobbin assembly 116a and contacts 120a from any fuel flow, such as through axial fuel passageway 126a, thereby eliminating the need for a plurality of "O" rings and additional assembly processes which were inherent in prior approaches. In addition, integrally forming a plastic housing around a magnetic core eliminates the need for a magnetic permeable housing which is prone to corrosion and the associated crimping, cold heading, and machining processes which were previously described disadvantages of prior approaches.

Continuing with FIGS. 3A-3B, magnetic core 124a, constructed of a magnetic permeable material, includes U-shape strap 123a having its open end welded to magnetic permeable assembly 128a having axial bore 130a formed therein. Sleeve 134a, having axially bored fuel passageway 146a and valve opening 148a circumscribed by conical seat valve 150a, is shown coupled to axial bore 130a of magnetic core 124a. Armature assembly 136a is shown including rotor or armature 138a, and stem 140a having conical needle 142a formed thereon for mating with conical seat valve 150a. Armature 138a is shown including recess 158a for positioning return spring 162a therein. Armature assembly 136a is shown positioned within sleeve 134a such that armature 138a resides within axial fuel passageway 126a and is biased away from upper leg 125a of magnetic core 124a by return spring 162a. Silicon etched nozzles 166a, described in U.S. Pat. No. 4,907,748 the specification of which is incorporated herein by reference, is shown communicating with valve opening 148a of sleeve 134a and attached thereto by retaining cap 168a. Retaining cap 168a of fuel injector 110a is adapted for insertion into the engine intake manifold (not shown) and sealed thereto by "O" ring 178.

During fuel injector operation, electronic fuel controller 113 demands a predetermined amount of fuel for delivery to the internal combustion engine by electronically actuating coil bobbin assembly 116a a predetermined time via electrical contacts 120a. In response, the magnetic field coupled to magnetic core 124a via coil bobbin assembly 116a axially displaces armature 138a in an upward direction against return spring 162a thereby displacing needle 142a from conical seat valve 150a. Fuel then flows from fuel path 156 through axial fuel passageway 126a of core fuel injector assembly 114a, axial fuel passage 146a and valve opening 148a of sleeve 134a, and silicon etched nozzles 166a, into the intake manifold (not shown). When electrical power is removed from coil bobbin assembly 116a, return spring 162a downwardly deflects armature assembly 136a thereby seating needle 142a against valve opening 148a to stop fuel flow through the injector. Since coil bobbin assembly 116a and contacts 120a are hermetically sealed from the fuel passageways by injection molded plastic 132, as previously described, fuel flowing through the passageways cannot come in contact with any electrical components. Should the bond between injection molded plastic 132 and magnetic core 124a ever develop a slight gap, fuel would still not come in contact with any electrical components, but would simply flow around magnetic core 124a and return to the fuel passageways (126a, 127a, or 146a).

The process steps for fabricating fuel rail 102 and fuel injectors 110a-110d are now described with reference to FIGS. 4-6, wherein like numerals refer to like parts shown in FIGS. 2 and 3A-3B. For ease of illustration, FIGS. 4-6 show only two fuel injectors (110b and 110d) formed within a portion of fuel rail 102. To further ease the illustration, the following discussion is with reference to only one fuel injector (110d), the components and process steps for fabricating being the same for fuel injectors 110a-110d.

Figure 4:
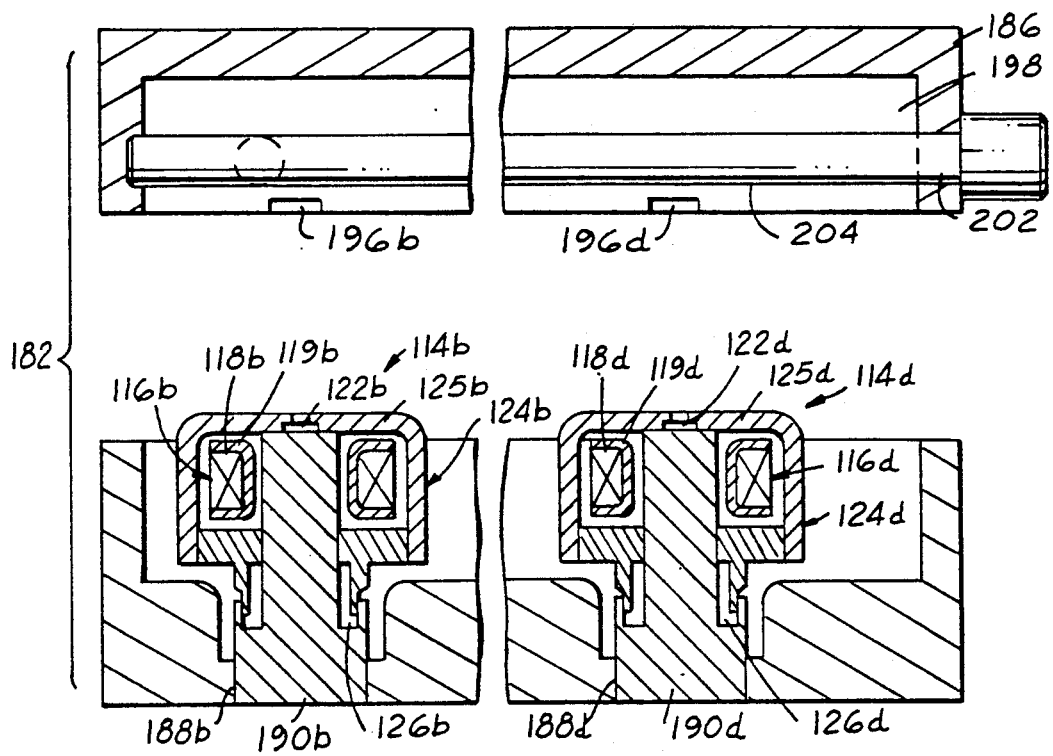
FIG. 4 illustrates placement of various fuel injector components shown in FIG. 2 within a two piece mold for purposes of describing various process steps.

Referring first to FIG. 4, two piece injection mold 182 is shown having lower mold 184 and upper mold 186 in the open position. Lower mold 184 is shown having recess 188d with removable pin 190d inserted therein. Core fuel injector assembly 114d is shown positioned over pin 190d within recess 188d. As described previously herein, core fuel injector assembly 114d includes coil bobbin assembly 116d, having wire 118d wound on bobbin 119d and contacts 120d (FIGS. 2 ad 3B) coupled to opposing ends of wire 118d, and positioned within magnetic core 124d. Pin 190d is shown inserted through fuel passageway 126d of core fuel injector assembly 114d and biased against upper leg 125d of magnetic core 124d.

Upper mold 186 is shown including injection inlet opening 196d communicating with recess 198 which has removable pin 202 disposed therein. Removable pin 202 includes flattened side 204 adapted for flush communication with upper leg 125d of magnetic core 124d when two piece mold 182 is assembled.

Figure 5:
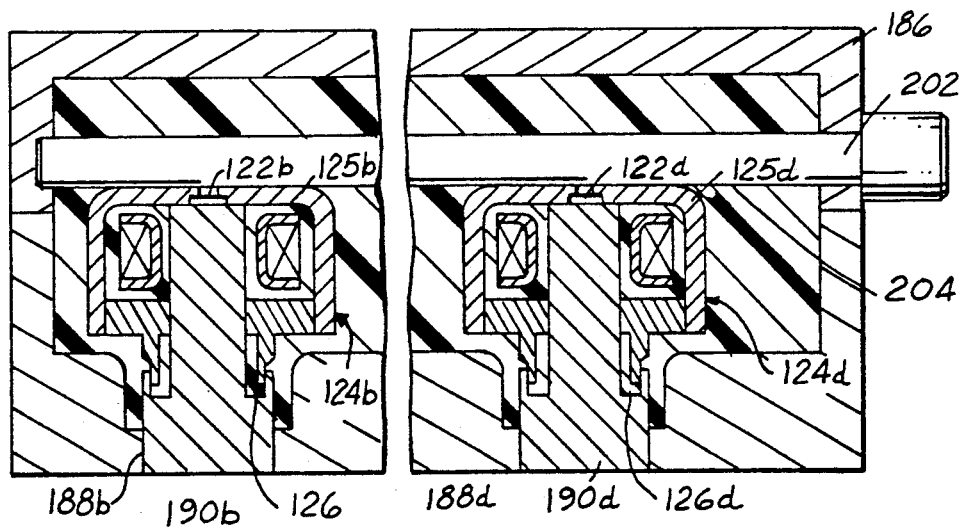
FIG. 5 is an additional illustration of the two piece mold shown in FIG. 4 provided for purposes of describing the process steps herein.

Referring now to FIG. 5, two piece injection mold 182 is shown in the mated position with pin 202 displaced against upper leg 125d of magnetic core 124d. Plastic as been injected through opening 196 to form fuel rail 102 and hermetically seal coil bobbin assembly 116d and magnetic core 124d within fuel rail 102.

Figure 6:
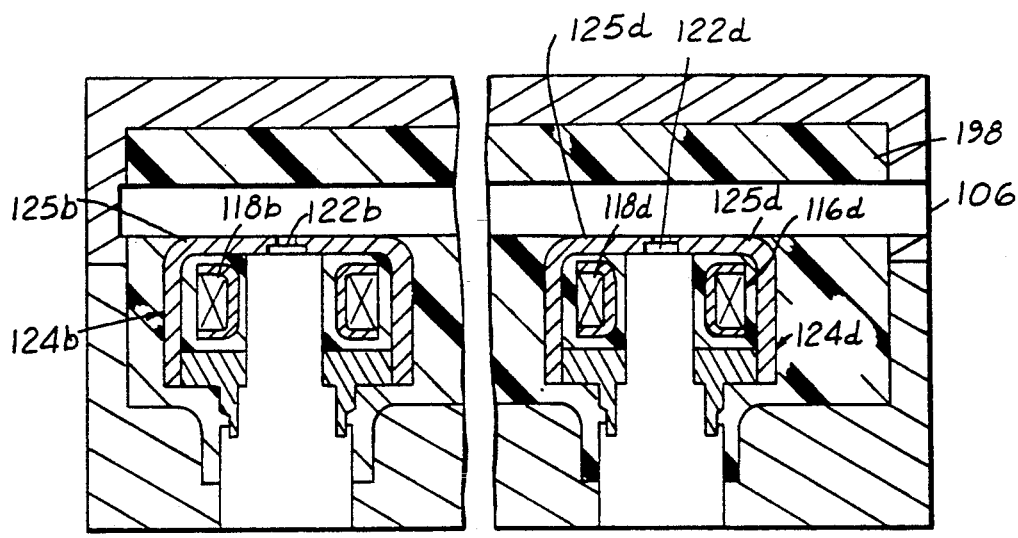
FIG. 6 is an additional illustration of the two piece mold shown in FIG. 4 provided for purposes of describing the process steps herein.

Referring to FIG. 6 and also referring to FIG. 3A, removal of pin 190d and pin 202d respectively defines axial fuel passageway 126d and fuel path 198 which communicate with each other through fuel opening 122d in upper leg 125d of magnetic core 124d.

An assembly process then follows which is more easily understood with reference to FIGS. 2 and 3A-3B wherein like numerals refer to like parts shown in FIGS. 4-6. Silicon nozzle assembly 166d is bonded to sleeve 134d in communication with valve opening 148d. Retaining cap 168d is then crimped onto sleeve 134d and "O" ring 178d positioned on sleeve 134d. Armature assembly 136d, having return spring 162d coupled to armature 138d, is inserted into sleeve 136d which is then axially inserted into fuel passageway 126d of core fuel injector assembly 114d. "O" ring 164d and retaining ring 170d are positioned for sealing sleeve 134d to housing 144d and completing the fabrication process.

In addition to the advantages described above, it is readily apparent that these fabrication processes eliminate the prior art need for a separately formed fuel rail, fuel connectors and associated fabrication and assembly steps. In addition, the prior fuel injector requirements for cold heading, machining and crimping. A more reliable fuel injector results requiring fewer assembly steps and sealing components, such as "O" rings, than heretofore possible.

An alternative embodiment is now described with particular reference to FIGS. 7, 8, and 9A-9C wherein like numerals refer to like parts shown in FIGS. 1-6.

Figure 7:
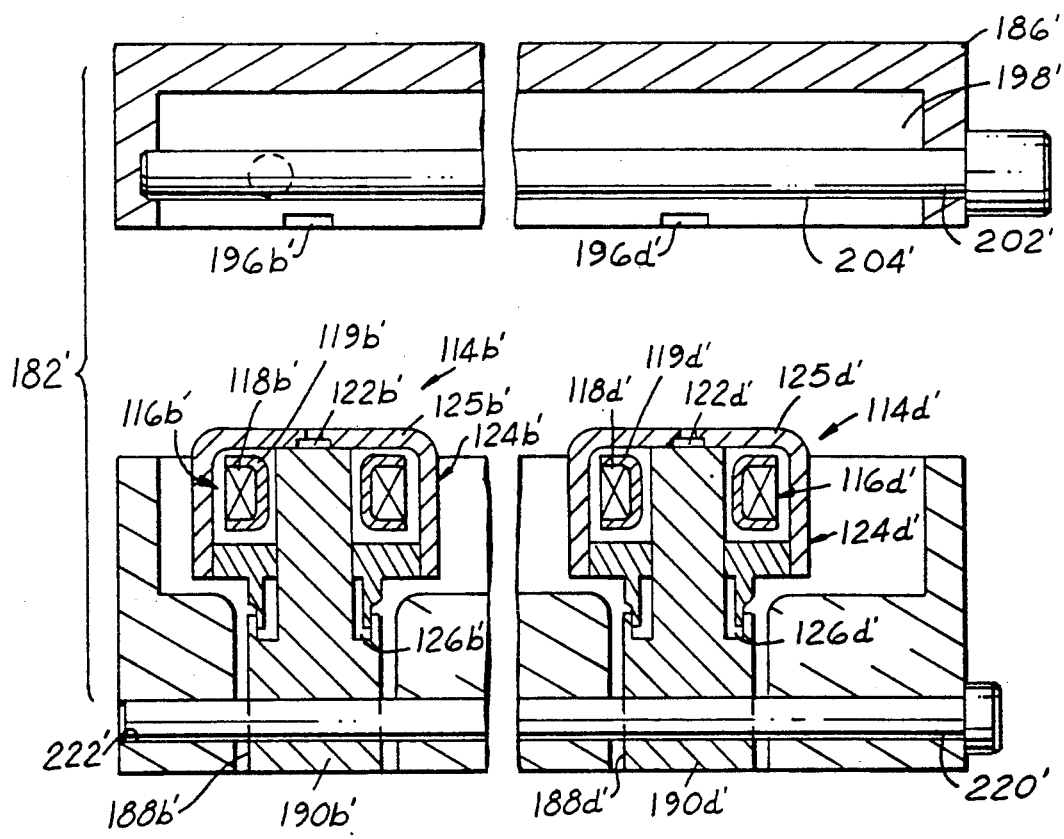
FIG. 7 is an alternate embodiment of the two-piece mold shown in FIG. 4.

Referring first to FIG. 7, two-piece mold 182' is shown substantially similar to two-piece mold 182 previously described with particular reference to FIGS. 4-6, with the addition of longitudinal pin 220'. Before the injection molding process, longitudinal pin 220' is inserted as shown through pins 190a-d'. After the injection molding process which was previously described herein, longitudinal pin 220' is removed thereby defining lower fuel path 220' which communicates with axial fuel passageways 126a-d'. The assembly process for fuel injectors 110a-d' proceeds as previously described with insertion of sleeves 134a-c' and respective armature assemblies 136a-c'.

Figure 8:
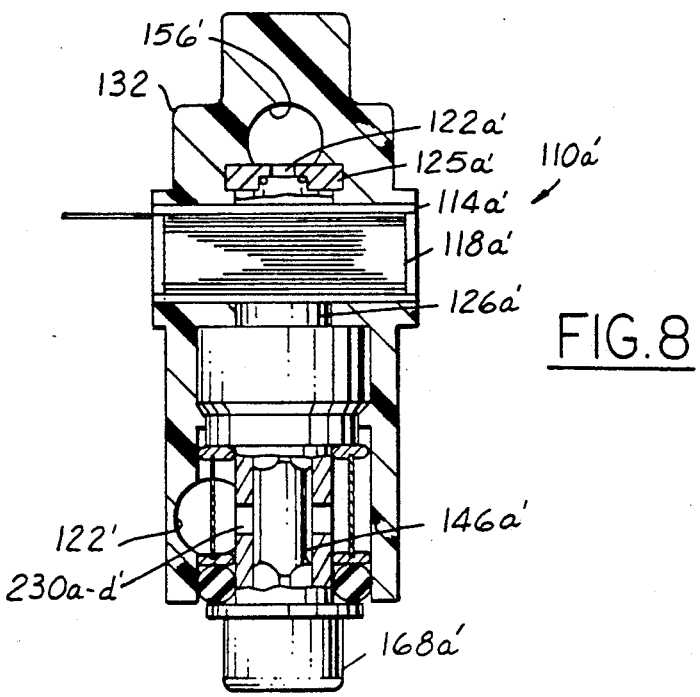
FIG. 8 is a cross-sectional view of a fuel injector partially embedded within a first rail formed in accordance with the embodiment shown in FIG. 7.

In this manner each fuel injectors 110a-d' are formed within fuel rail 102' communicating with upper fuel passageway 106' and lower fuel passageway 122' as shown in FIG. 8. In this particular configuration, fuel passageway 122' communicates with axial fuel passageways 146a-d' via respective bores 230a-d' through respective sleeves 134a-d'. Fuel is provided through upper fuel path 106' and excess fuel returned through fuel path 122'. This configuration is shown schematically in FIG. 9C.

Figure 9A:
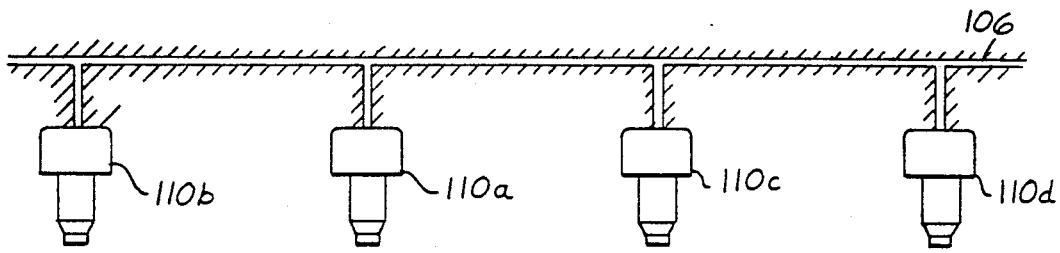
FIGS. 9A-9C are a schematic representation of three alternative fuel connections between the fuel injectors in accordance with the fabrication process shown in FIG. 7.
Figure 9B:
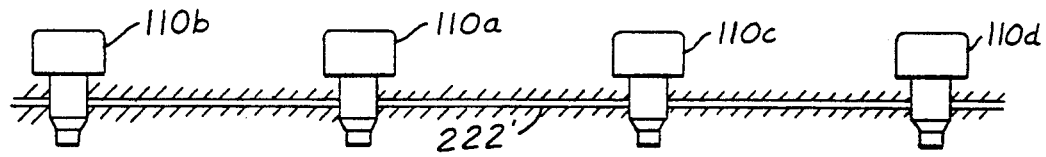

Another alternate embodiment is provided wherein fuel is supplied through lower fuel path 122' as shown schematically in FIG. 9B. This particular configuration is provided by two-piece mold 182' as follows. Pin 202' is not utilized during the molding process. Longitudinal pin 220', however, is utilized to form lower fuel path 222' as previously described. Accordingly, after the injection molding process steps previously described, a fuel injector rail and embedded fuel injectors are formed having fuel feed only through lower fuel path 222'.

Figure 9C:
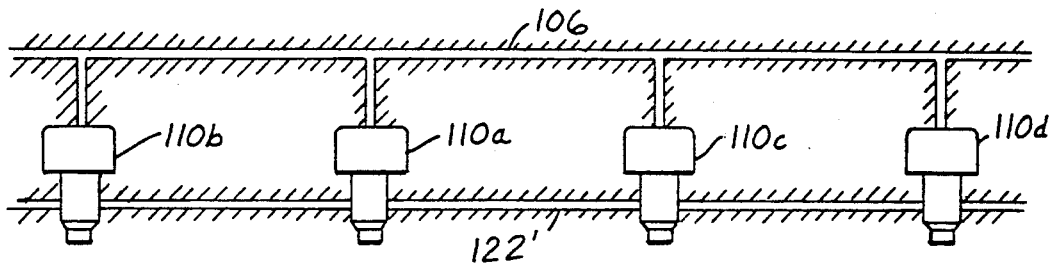

In accordance with the above alternative embodiments, three possible fuel feed figurations are achieved as shown schematically in FIGS. 9A-9C by judicious selection of pins 202' and 220' in two-piece mold 182'. This provides the designer and fabricators with flexibility in providing fuel rails, and also fuel injectors which was not hereto before possible.

This concludes the Description of the Preferred Embodiment. The reading of it by those skilled in the art will bring to mind many alterations and modifications without parting from the spirit and scope of the invention. For example, the fuel injector claimed herein may be used to advantage with magnetic cores and coil bobbin assemblies different from the particular configurations shown in the Description of the Preferred Embodiment. Accordingly, it is intended that the scope of the invention be limited only by the following claims.

What is claimed is:

1. An integrally formed fuel rail assembly coupled to a source of fuel, comprising:
   a plurality of core fuel injector assemblies each including a magnetic core having an electric coil assembly positioned adjacent said magnetic core;
   said electric coil assembly having wire wound around a bobbin, said bobbin including an axial opening;
   molded means comprised of injection molded plastic for forming a fuel rail and for hermetically sealing each of said coil assemblies and each of said magnetic cores within said fuel rail, said molded means also forming a fuel path within said fuel rail and forming fuel passageways within said axial opening of said electric coil assembly in each of said core fuel injector assemblies, each of said fuel passageways being formed with cylindrical walls integrally formed from said plastic and communicating with said fuel path.

2. The fuel rail assembly recited in claim 1 wherein each of said armatures and each of said valve means may be removed from said fuel rail assembly and replaced.

3. An integrally formed fuel rail assembly coupled to a source of fuel, comprising:
   a plurality of core fuel injector assemblies each including an electric coil assembly positioned within a magnetic core with an electrical contact extending from said electric coil assembly;
   molded means comprised of injection molded plastic for hermetically sealing each of said coil assemblies within each of said magnetic cores and also forming a fuel passageway having cylindrical walls integrally formed from said plastic within each of said coil assemblies, said molded means also forming a fuel rail having said electrical contacts extending therethrough and forming a fuel path communicating with each of said fuel passageways for coupling each of said fuel passageways to the fuel supply;
   a plurality of armatures each slidably inserted into one of said fuel passageways and magnetically responsive to said magnetic core; and
   a plurality of valve means each being mechanically responsive to a corresponding one of said armatures and coupled to a corresponding one of said fuel passageways for controlling fuel flow from said fuel path through said valve means.

4. The fuel rail assembly recited in claim 3 wherein each of said valve means comprises a needle and seat valve having said needle connected to a corresponding one of said armatures.

5. The fuel rail assembly recited in claim 3 further comprising a silicon etched nozzle coupled to each of said valve means.

* * * * *